Patented June 27, 1939

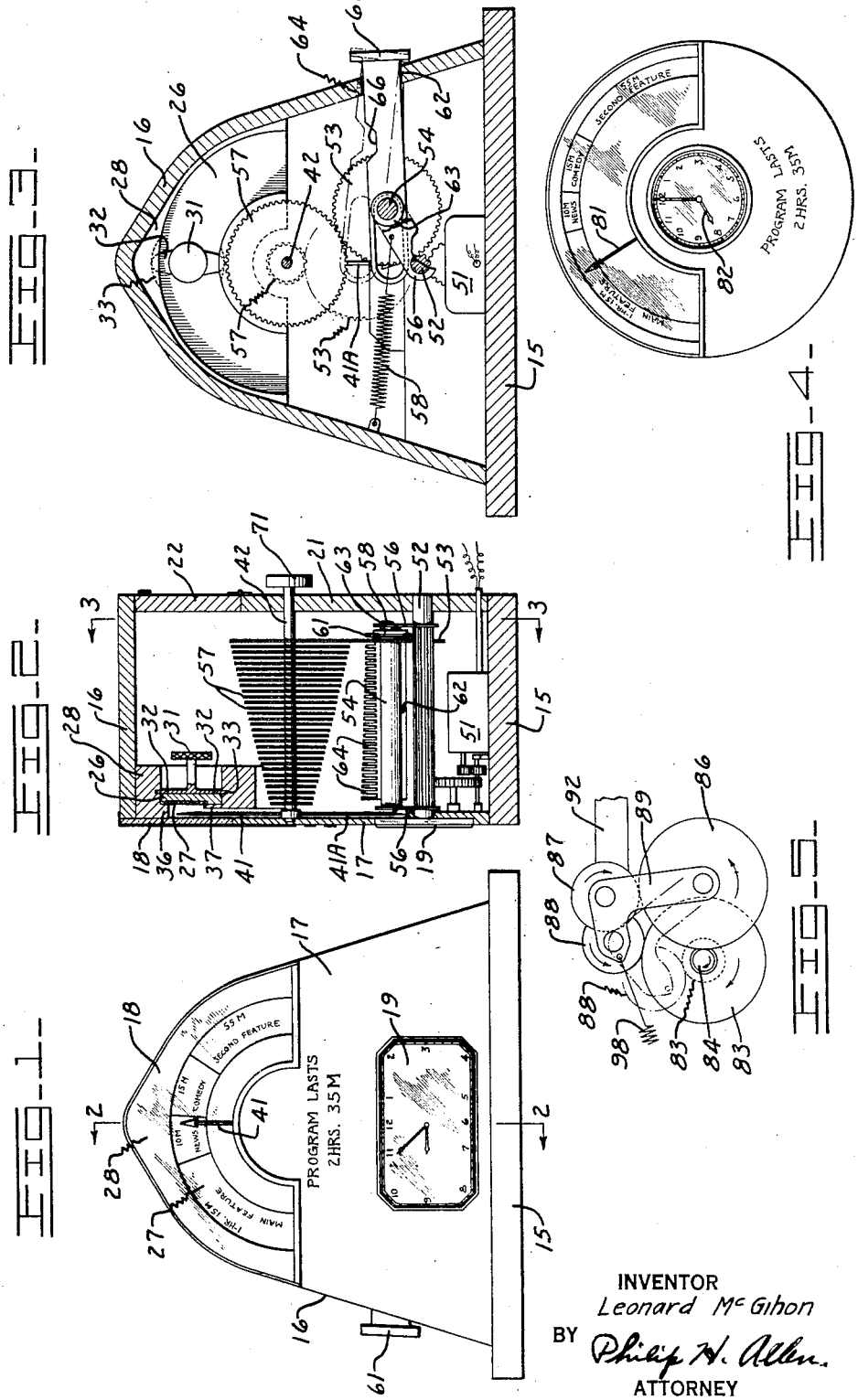

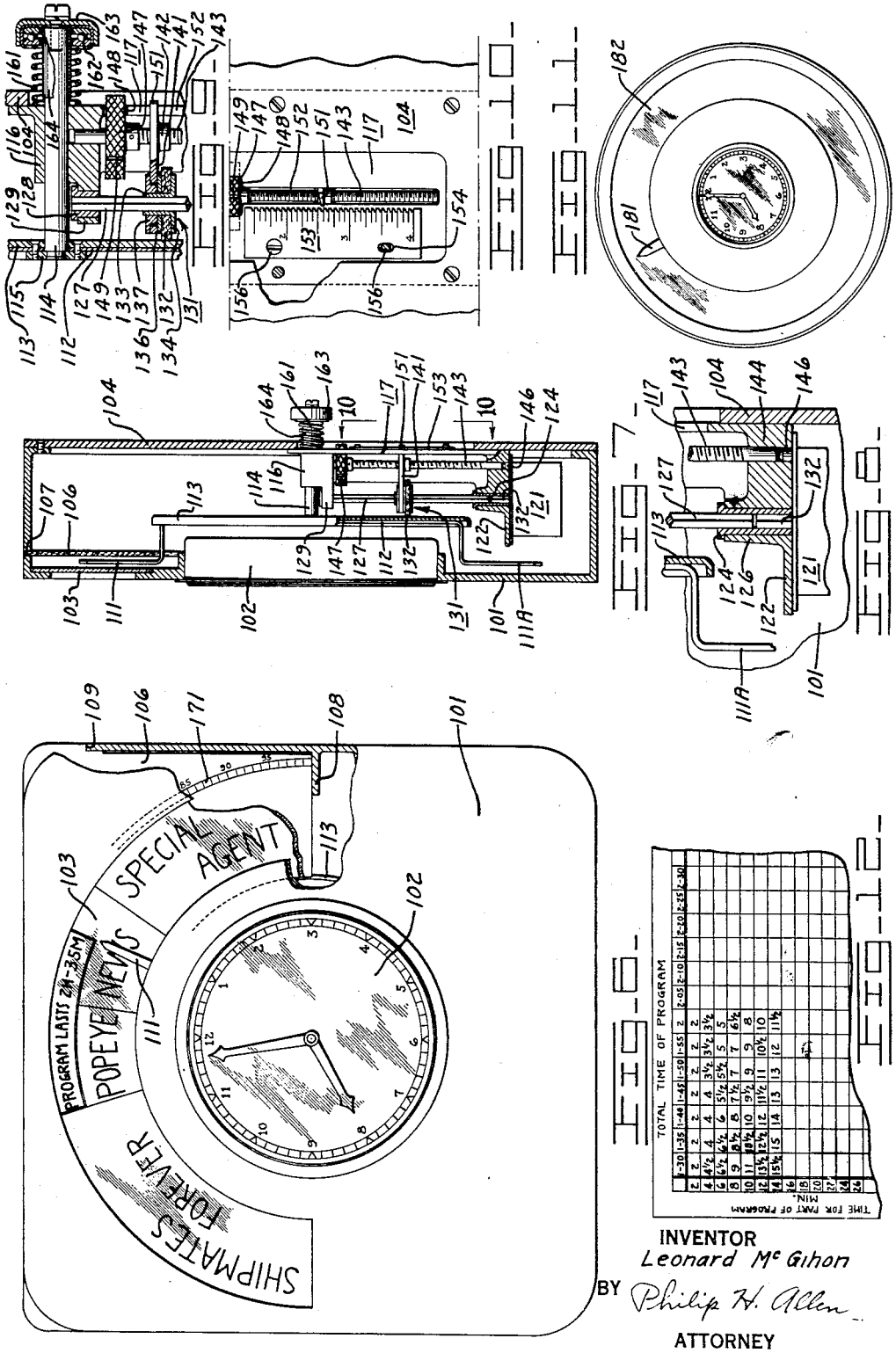

2,163,616

UNITED STATES PATENT OFFICE 2,163,616

PROGRAM INDICATOR

Leonard McGihon, San Leandro, Calif.

Application February 15, 1936, Serial No. 64,101

3 Claims. (Cl. 161—1)

The present invention relates to program indicators and the like, and more particularly to an indicator of this character for use with programs of varying length, and having sections of varying length such as theater programs.

It is an object of the invention to provide program indicating means which will indicate at all times the part of the program which is being shown.

Another object of the invention is to provide program indicating means which will show at all times the amount of time remaining until the end of the program or any part thereof.

Another object of the invention is to provide program indicating means which is readily adaptable to programs of varying length.

Another object of the invention is to provide program indicating means which can be used with repeated programs without resetting.

Another object of the invention is to provide program indicating means including an indicator which can be driven at any selected one of a plurality of speeds.

Another object of the invention is to provide program indicating means in which a fixed length of display space can be used to represent varying lengths of time.

Another object of the invention is to provide program indicating means in which consecutively repeated programs are indicated automatically without attention.

Another object of the invention is to provide program indicating means in which unforeseen delays or interruptions in the program can be compensated for easily.

Another object of the invention is to provide program indicating means attaining the foregoing and other objects and having a simple and economical construction as to manufacture and assembly.

Other objects will appear as the description progresses with reference to the attached drawings.

In the drawings:

Figures 1–3 illustrate one form of the invention.

Figure 1 is a front elevation of the program indicator embodying my invention.

Figure 2 is a vertical section taken in a plane indicated by the line 2—2 in Fig. 1.

Figure 3 is a vertical transverse section taken in a plane indicated by the line 3—3 in Fig. 2.

Figures 4 and 5 illustrate a modified form of the invention.

Figure 4 is a front elevation similar to Fig. 1.

Figure 5 is a schematic view illustrating a modified drive control of the type shown in Figs. 2 and 3.

Figures 6 thru 10 illustrate the preferred form of the invention.

Figure 6 is a front elevational view of a program indicator, the view being partially broken away to illustrate certain features of construction.

Figure 7 is a vertical transverse sectional view taken through the axis of the indicator hand with certain parts shown in elevation.

Figure 8 is an enlarged sectional view of a portion of Figure 7.

Figure 9 is an enlarged sectional view of a portion of Figure 7.

Figure 10 is a view of the adjustable setting means for the indicator and is taken in a plane indicated by the line 10—10 in Figure 7.

Figure 11 is a schematic elevational view of a modified form of the invention.

Figure 12 illustrates a chart which facilitates the location of the proper program divisions for any particular length program.

The program indicator of my invention while useful with other programs is particularly adapted for use with theatre programs which run continuously, and which are made up of a number of units, such as feature pictures, comedies, newsreels, and the like, so that the length of different programs will vary.

Generally, my invention contemplates the provision of a dial or the like on which the length of different parts of a program playing at a theatre or the like can be represented by a section of the dial in its proportion to the total length of the program as represented by the total length of the dial, together with an indicating hand or the like and mechanism for causing the hand to traverse the dial in the total length of time of the program so that the length of time remaining for any part of the program can be estimated accurately during any one of the various successive programs. More specifically, an arcuate dial is provided, preferably of 180° extent, to receive the indicia of a program, and a pair of indicating hands spaced 180° apart, which traverse the dial successively, and which are driven through a selected one of plurality of gear ratios from a timed source of power, such as an electric clock motor or the like.

In the form of the invention shown in Figs. 1–3, the program indicator includes a casing to house the working parts of the indicator. The dial bearing the program indicia is arcuate in shape and is removably mounted at the top of the casing above the face of the clock which, through selective change speed gearing, drives the oppositely extending indicator hands.

The casing includes base 15 (Figs. 1–3) having U-shaped housing member 16 secured thereon to form the top and side walls of the casing. Front wall 17 is secured to base 15 and member 16 and is apertured at the top to receive sight glass 18 and adjacent the bottom to receive clock face 19. Rear wall 21 is secured between base 15 and the side walls of member 16 leaving an opening at the top of the casing to provide access thereto. The opening is closed by door 22 hinged on rear wall 21 and having a conventional latch fastening with member 16.

The indicia bearing dial comprises arcuate plate 26 (Figs. 2 and 3) of 180° extent which has an arcuate recess throughout its length to receive detachable arcuate card or strip 27 on which the program indicia is placed as shown in Fig. 1. Plate 26 is mounted in the indicator by bracket 28 which is secured to housing member 16 and has an arcuate opening to receive plate 26 and position strip 27 to display the indicia thereon. Clamping means are provided to maintain plate 26 in position comprising clamp 31 (Figs. 2 and 3) having opposite fingers 32 engaged with the back of plate 26 and with their ends positioned in arcuate clamping slots 33 in bracket 28. Clamp 31 holds plate 26 against opposite annular lips 36, 37 on bracket 28, which overlap strip 26 to define the sight opening.

For cooperation with the indicia bearing dial, a multiple handed indicating means is provided, with the hands thereof positioned an angular distance apart equal to the arcuate extent of the dial which is contained an integral number of times in 360°. In the construction shown in Figs. 2 and 3, the indicating means comprises oppositely extending hands 41, 41A mounted on shaft 42 which has its ends journalled in front and rear walls 17 and 21. Because hands 41, 41A are spaced apart an exact fraction of 360°, as one hand leaves the dial, the other begins its traverse thereof.

The selective change speed drive provides for traverse of the dial by the indicating means in any selected time interval in a given range, which, in the embodiment shown, is from one and one half to four hours, with steps of five minutes. The driving means comprises electric clock motor 51 (Figs. 2 and 3) of conventional construction, which through suitable gearing drives the hour and minute hands associated with clock face 19. Hour hand drive shaft 52 (Fig. 2) has its ends journalled in walls 17 and 21 and is splined intermediate its ends for cooperation with gear 53 slidably and rotatably mounted on shaft 54. Shaft 54 is mounted for arcuate movement about the axis of shaft 52 by spaced arms 56. Gear 53, therefore, is shiftable both axially and arcuately to engage any of a series of gears 57 (Figs. 2 and 3) secured in spaced relation on shaft 42. Similar springs 58 tensioned between respective arms 56 and housing member 16 maintain gear 53 in engagement with any associated gear 57. The pitch diameters of gears 57 increase by equal amounts from one end of the series to the other and are selected with respect to the pitch diameters of gear 53 and splined shaft 52 so that shaft 42 will receive one half rotation in any selected length of time between one and one half and five hours. As shown, the time intervals vary five minutes between adjacent gears 57. To adjust gear 53 and select the drive interval in accordance with a given length program, adjusting member 61 (Fig. 3) extends through transverse opening 62 in one side of housing member 16 and has its inner end slotted for engagement with grooved hub 63 of gear 53 (Figs. 2 and 3), the upper edge of member 61 being engaged with one of slots 64 (Fig. 2) at the upper edge of opening 62. To adjust gear 53, adjusting member 61 (Fig. 3) is pulled out to disengage gear 53 from the gear 57 and to place recess 66 thereof in alignment with the edge of slot 62. Member 61 can then be moved laterally to the slot 64 aligned with the gear 57 of the desired pitch diameter, when member 61 is released and springs 58 move gear 53 into mesh with the aligned gear 57. In Fig. 3, gear 53 is shown in full lines as being engaged with the largest gear 57 for a four hour program, and in phantom lines as being engaged with the smallest gear 57 for a one and one-half hour program. To set hands 41, 41A initially, or if for any reason it is desired to change the position of hand 41 to compensate for an interruption of the program, gear 53 is moved out of engagement with the associated gear 57 and shaft 42 is turned by manipulation of setting knob or handle 71 (Fig. 2).

The manner of dividing the indicia bearing space on strip 27 to represent the relative time lengths of the various parts of the program is described in connection with the preferred embodiment of the invention.

The form of the invention shown in Figs. 4 and 5 is generally similar to that described above and the description with respect thereto will be confined to the principal differences, which relate to the arrangement of the mechanism and not to the mode of operation. Indicating means 81 has the same axis of rotation as clock hands 82 and the selective change speed gears 83. Gears 83 are driven selectively from hour hand shaft 84 thru idler gears 86, 87 and axially shiftable gear 88 mounted for arcuate movement about the axis of gear 86 by arms 89. In its full line position, gear 88 is shown meshed with gear 83 of greatest pitch diameter, while in its phantom line position, gear 88 is meshed with gear 83 of smallest pitch diameter. Spring 98 maintains the engagement of the gearing as selected by manipulation of adjusting member 92. This modified form of construction is especially adaptable to the circular type of case shown in Fig. 4.

The preferred form of the invention is illustrated in Figs. 6–10 which incorporates the broad features of the invention noted above and also provides a simplified construction which lends itself to economical production of the indicator. The program indicator comprises case or housing 101 (Figs. 6 and 7) which is of general rectangular shape and has suitable openings in the front wall thereof to receive the clock 102 and sight glass 103. The back of housing 101 is open and cover 104 is detachably secured thereto by suitable fastening screws. The indicia bearing member comprises plate 106 of cardboard or the like, mounted in transverse slot 107 formed in housing 101, and held in place with respect to housing 101 by similar means at each end thereof. Each end of plate 106 is supported by a bracket 108 in housing 101 and by shoulder 109 engaging the bottom of a slot 107. The upper corners of plate 106 project beyond housing 101 as seen in Fig. 6 so that they can be grasped readily to remove the plate.

The indicating means for cooperation with the indicia on plate 106 comprises hands 111, 111A formed by offsetting the ends of a strip 112 which is secured on driven disc 13 of the change speed mechanism and supporting shaft 114 therefor. Strip 112 has a central aperture engaging over shaft 114 and the parts are secured together by washer 115 engaging the reduced end of shaft 114 and secured to disc 113 by suitable fastening screws. Shaft 114 is journalled in boss 116 of bracket 117 detachably secured on cover 104. Bracket 117 provides a mounting for all the drive mechanism of the program indicator, which is assembled thereon and installed with cover 104 in the housing.

The driving means for the indicator provides for any selected gear ratio drive to vary the total program length from one and one-half to four hours. For this purpose electric clock motor 121 (Figs. 7 and 8) is secured beneath end flange 122 of bracket 117 and has a square drive shaft 132 engaged in square holed bushing 124 which is journalled in boss 126 of bracket 117. Square shaft 127 also fits within bushing 124 and has its upper end mounted by bushing 128 journalled in boss 129 of bracket 117. Shaft 127 cannot fall from place as it is positioned directly beneath shaft 114.

A settable change speed drive connection is provided between motor 121 and driven disc 113 in the form of drive wheel 131 which is slidably mounted on shaft 127 and has driving engagement with disc 113.

Drive wheel 131 comprises disc 132 of fibre or the like mounted on sleeve 133 and held between annular flange 134 thereof and washer 136. Collar 137 has a press fit on sleeve 133 to maintain the parts in assembled position. To provide for radial adjustment of wheel 131 with respect to drive disc 113, adjusting arm 141 which is apertured at one end to fit over a reduced portion of collar 137, has threaded hub 142 engaged by threaded shaft 143. Shaft 143 has its ends journalled in respective bosses 116, 144 of bracket 117 and is positioned in parallel relation to shaft 127. The endwise position of shaft 143 is maintained by pin or plug 146 (Fig. 8) press fitted in boss 144. To provide for manipulation of shaft 143, knurled disc 147 (Fig. 9) is pinned thereon and extends through slot 148 in bracket 117. By turning shaft 143 the position of wheel 131 with respect to driven disc 113 can be varied so that hands 111, 111A will be driven one-half revolution in any selected time interval from one and one-half to four hours. The setting of wheel 131 is indicated by the position of end 151 of arm 141 which fits within guide slot 152 of bracket 117 and has a beveled indicating edge registering with scale divisions on plate 153. The numbered divisions represent hours, and the smaller divisions therebetween represent five minute intervals, however, finer divisions can be made if desired. Disc 147 provides for such finer adjustment and has three slots 149 equally spaced around the periphery thereof (Figs. 9 and 10) to represent minute changes in the position of wheel 131 which is effected by one-third rotation of disc 147 and shaft 143. To provide for initial adjustment of plate 153 and the indicating edge on arm 141, plate 153 is mounted for endwise movement by slots 154 engaging fastening studs 155 therefor.

The driving and driven elements are urged resiliently into engagement with each other, and such engagement can be released to provide for setting of the indicating means. Shaft 114 and driven disc 113 are urged constantly to the right as viewed in Fig. 7 by spring 161 compressed between bracket 117 (Fig. 9) and bearing 162 mounted in bearing cage 163 on shaft 114. By compressing spring 161, shaft 114 can be moved longitudinally in boss 116 to move driven disc 113 out of engagement with driving wheel 131 when hands 111, 111A can be set to any desired position by manipulating bearing cage 163. The limit of movement of disc 113 is determined by sleeve 164 secured on shaft 114 and having an end spaced from boss 116 of bracket 117. This spacing is less than the distance between hand 111 and sight glass 103.

To aid in spacing the parts of a program in the proper proportion, indicating plate 106 (Fig. 6) has arcuate scale 171 marked thereon having one hundred divisions in the 180° arc. This scale is used in conjunction with the chart shown in Fig. 12, where the number of scale units for a given length of time is given in different columns for various total times of programs. Thus, a twelve minute part of a two hour program, would occupy ten divisions on scale 171. When plate 106 is in place in the indicator, scale 171 is concealed.

In Fig. 11, another embodiment of the invention is shown in which a single indicating hand 181 cooperates with arcuate indicia bearing dial 182 of 360° extent. The mechanism of Figs. 1-3 and of Figs. 6-10 can be used with this type of indicator.

I, therefore, claim as my invention:

1. A program indicator for indicating at any time the stage of a constantly recurring program, comprising a member of fixed length for displaying indicia of a program, the indicia for each part of the program occupying a proportional part of said length in the ratio of the time interval of said part to the total time of the program, a plurality of indicating hands for cooperation with said member and the indicia thereon, said hands being equally spaced apart so that as one of said hands ends its traverse of said member another hand begins its traverse thereof, means for driving said hands to traverse said member at a uniform rate of speed, and an adjustable connection in said driving means for selecting the drive speed of said hands to adjust the time required by an indicating hand to traverse said member to equal the total time of the program.

2. A program indicator for indicating at any time the stage of a constantly recurring program, comprising a housing, an indicia displaying member of fixed length in said housing, the indicia of each part of the program occupying a proportional part of said length in the ratio of the time interval of said part to the total time of the program, a plurality of indicating hands movably mounted in said housing for cooperation with said member and the indicia thereon, said hands being equally spaced apart so that as one of said hands ends its traverse of said member another hand begins its traverse thereof, means for driving said hands to traverse said member at a uniform rate of speed, an adjustable connection in said driving means for selecting the drive speed of said hands to adjust the time required by an indicating hand to traverse said member to equal the total time of the program, and a common bracket mounting both said driving means and said hands in said housing.

3. A program indicator for indicating at any time the stage of a constantly recurring program, comprising a housing, an indicia displaying member of fixed length in said housing, the indicia of each part of the program occupying a proportional part of said length in the ratio of the time interval of said part to the total time of the program, a plurality of indicating hands movably mounted in said housing for cooperation with said member and the indicia thereon, said hands being equally spaced apart so that as one of said hands ends its traverse of said member another hand begins its traverse thereof, means for driving said hands to traverse said member at a uniform rate of speed, an adjustable connection in said driving means for selecting the drive speed of said hands to adjust the time required by an indicating hand to traverse said member to equal the total time of the program, a scale on said housing showing a range of program time lengths, and a pointer associated with said scale and said adjustable connection for indicating the total length of the program corresponding to the adjustment of said adjustable connection.

LEONARD McGIHON.